(12) United States Patent
Risser et al.

(10) Patent No.:  US 12,585,052 B2
(45) Date of Patent:  Mar. 24, 2026

(54) DISPERSIVE OPTICAL ELEMENTS, DEVICES, SYSTEMS AND METHODS USING THE SAME

(71) Applicant: Battelle Memorial Institute, Columbus, OH (US)

(72) Inventors: Steven M. Risser, Reynoldsburg, OH (US); Richard J. Higgins, Lewis Center, OH (US); Jonathan A. Gluck, Columbus, OH (US); Douglas A. Thornton, Columbus, OH (US); Richard W. Ridgway, Westerville, OH (US)

(73) Assignee: Battelle Memorial Institute, Columbus, OH (US)

( * ) Notice: Subject to any disclaimer, the term of this patent is extended or adjusted under 35 U.S.C. 154(b) by 389 days.

(21) Appl. No.: 18/549,694

(22) PCT Filed: Mar. 8, 2022

(86) PCT No.: PCT/US2022/019350
§ 371 (c)(1),
(2) Date: Sep. 8, 2023

(87) PCT Pub. No.: WO2022/192264
PCT Pub. Date: Sep. 15, 2022

(65) Prior Publication Data
US 2024/0159945 A1  May 16, 2024

Related U.S. Application Data

(60) Provisional application No. 63/158,705, filed on Mar. 9, 2021.

(51) Int. Cl.
*G02B 5/04* (2006.01)
*G02B 6/293* (2006.01)

(52) U.S. Cl.
CPC .......... *G02B 5/04* (2013.01); *G02B 6/29373* (2013.01)

(58) Field of Classification Search
CPC ............................. G02B 5/04; G02B 6/29373
See application file for complete search history.

(56) References Cited

U.S. PATENT DOCUMENTS 5,729,641 A * 3/1998 Chandonnet .......... G02F 1/0118
385/2
6,136,736 A  10/2000 Rajaram et al.
(Continued)

OTHER PUBLICATIONS

International Search Report and Written Opinion of International Application No. PCT/US2022/019350, mail date Jul. 8, 2022, 15 pages.

*Primary Examiner* — Paisley L Wilson
(74) *Attorney, Agent, or Firm* — Grossman, Tucker, Perreault & Pfleger, PLLC; Edmund P. Pfleger

(57)  ABSTRACT

The present disclosure provides a dispersive optical device (DOD) that includes a first material having a first refractive index (n1) at a first wavelength (W1) and a first chromatic dispersion (D1); and at least one dispersive optical element (DOE) optically coupled in the first material, the at least one DOE comprising a second material containing a chromophore. The at least one DOE has a second refractive index (n2) at W1; a ratio of n2 to n1 is less than or equal to about 1.05; and the at least one DOE has a second chromatic dispersion (D2), wherein D2 is at least 10 times greater than D1.

28 Claims, 10 Drawing Sheets

700

Cover 707

A ------- Waveguiding Layer 705 | DOE 600 | Waveguiding Layer 705 ------- A

Cladding 703

Substrate 701

(56) References Cited

U.S. PATENT DOCUMENTS

| | | | | |
|---|---|---|---|---|
| 2002/0185633 | A1* | 12/2002 | McGinniss | G02F 1/3617 |
| | | | | 252/582 |
| 2006/0106262 | A1 | 5/2006 | McGinniss et al. | |
| 2006/0182401 | A1* | 8/2006 | Risser | C09K 19/544 |
| | | | | 385/144 |
| 2007/0195418 | A1 | 8/2007 | Kogure et al. | |
| 2008/0310023 | A1 | 12/2008 | Feldman | |
| 2015/0346580 | A1* | 12/2015 | Williams | G02F 1/353 |
| | | | | 977/783 |

* cited by examiner

200

300

Refractive Index and Chromatic Dispersion of DR1 in Polymethylmethacrylate as a Function of Wavelength

400

Chromatic Dispersion of Silica, DR1 in PMMA,
Shifted Chromophore

500

500

600

700

700

DISPERSIVE OPTICAL ELEMENTS, DEVICES, SYSTEMS AND METHODS USING THE SAME

CROSS-REFERENCE TO RELATED APPLICATION

This is the U.S. National Phase Application under 35 U.S.C. § 371 of International Patent Application No. PCT/US2022/19350 filed Mar. 8, 2022, which claims the benefit of U.S. Provisional Application No. 63/158,705 filed on Mar. 9, 2021, both of them are incorporated by reference herein.

TECHNICAL FIELD

The present disclosure relates generally to dispersive optical elements, devices, systems and methods using the same. In particular, the disclosure relates to optical elements that have high chromatic dispersion, devices using the same, and instruments using the same.

BACKGROUND

Light traveling through a first medium such as air may bend (refract) in accordance with Snell's law when it is incident on an interface with another medium, such as a lens. The degree to which the light incident on the interface is bent (i.e., the refractive index) depends in part on the wavelength of the incident light, a phenomenon which is referred to as chromatic dispersion.

Snell's law is given by: $n_1 \sin(\Theta_1)=n_2 \sin(\Theta_2)$, where $n_1$ and $n_2$ are the refractive indices of a first media and a second media, respectively, $\Theta_1$ is the angle of incidence for an incident light ray, and $\Theta_2$ is the angle of refraction. FIG. 1 illustrates a graph 100 of one application of Snell's law for a light ray that is incident on an interface between a region of lower refractive index (in this case, $n_1$) to a region of higher refractive index (in this case, $n_2$). As can be seen, the light ray is incident on the interface at an incidence angle $\Theta_1$ and leaves the interface at a refraction angle $\Theta_2$.

Chromatic dispersion is often represented using the Sellmeier equation:

$$n^2(\lambda) = 1 + \sum_i \frac{B_i \lambda^2}{\lambda^2 - C_i}$$

where n is the refractive index, $\lambda$ is the wavelength, and $B_i$ and $C_i$ are Sellmeier coefficients. With that in mind, typical prisms are made of glass with relatively low chromatic dispersion and are able to adequately separate wavelengths of light that are spaced relatively far apart. For example, a glass prism may be used to separate green (500 nanometer (nm)) light from red (700 nm) light. However, the chromatic dispersion of a glass prism is often too small to usefully separate wavelengths of light that are very close to one another, e.g., wavelengths that differ from one another by less than or equal to about 1 nm, 0.5 nm, 0.1 nm, 0.05 nm, 0.01 nm, 0.005 nm, 0.001 nm, or even 0.0005 nm or less. Notably, wavelengths of light that are separated by small differences in wavelength may significantly differ in frequency. For example, light at 700.000 nm and 700.005 nm are separated by approximately 3 GHz in the frequency domain.

FIG. 2 illustrates a plot 200 of refractive index and chromatic dispersion of silica as a function of wavelength. As can be seen, the refractive index of silica generally decreases from about 1.4625 at 500 nm to about 1.445 at 1500 nm. Likewise, the chromatic dispersion of silica decreases from about 0.000055 at 500 nm to about 0.00001 at 1500 nm. Based on that information an example may be considered in which 700 nm red light (700 nm) and 630 nm orange light strike an interface between air and a silica prism at an incidence angle of 88°. Applying Snell's law, it can be determined that the 700 nm red light will leave the interface at an refraction angle of 43.36915°, whereas the 630 nm orange light will leave the interface at an refraction angle of 43.30144°. The 0.06771° angular separation between the refraction angle of the 700 nm red light and the 630 nm orange light is sufficient to allow the red and orange colors to be resolved by current optical detectors or even the human eye. Under the same conditions, however, red light with a wavelength of 700.05 nm that is incident on the air/silica interface would leave that interface at an angle of 43.36919°, i.e., at an angular separation of only 0.00004° relative to the refraction angle of 700 nm red light. Due to that small angular different, many detectors may be unable to resolve the 700.05 nm light from the 700 nm light.

Accordingly, a need remains in the art for optical elements that can better separate closely spaced wavelengths of light. The present disclosure is aimed at that need.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
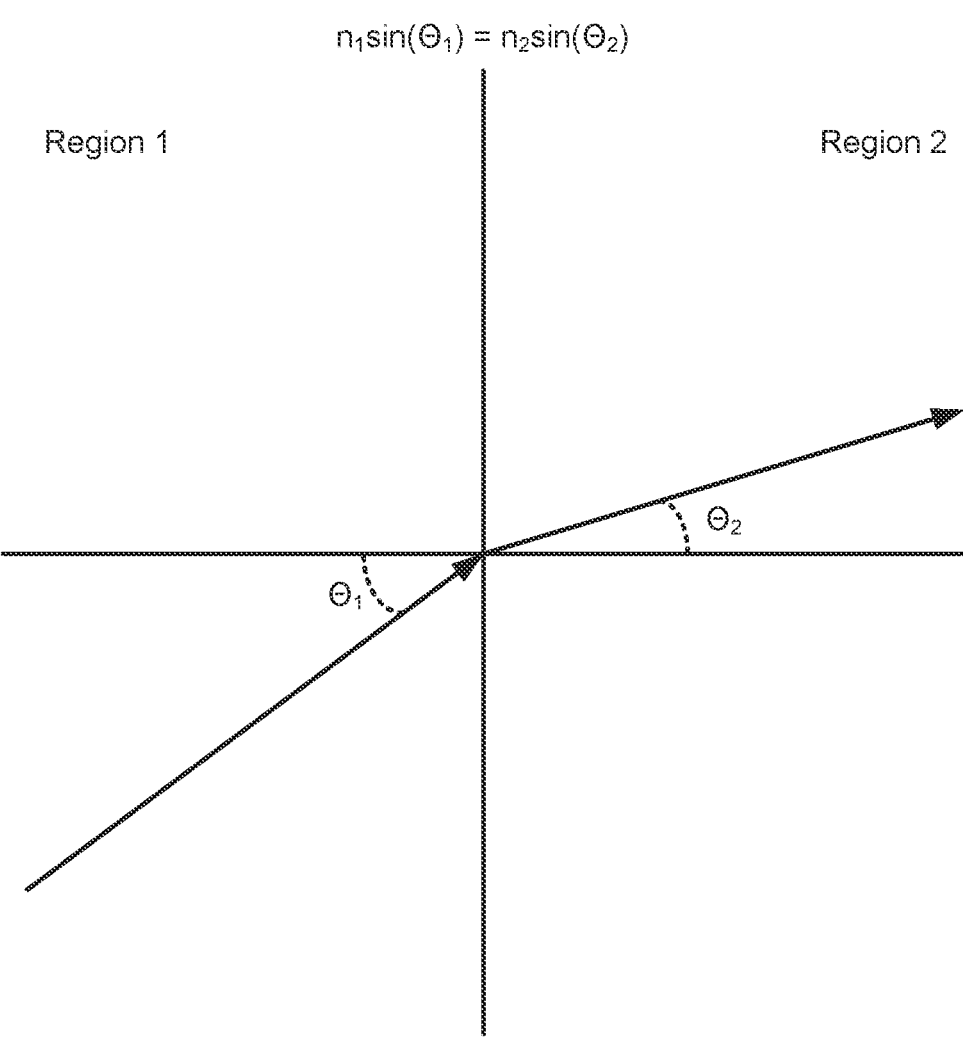
FIG. 1 illustrates a graph of Snell's law for light incident on an interface between a medium of lower refractive index ($n_1$) and a medium of higher refractive index ($n_2$), in accordance with the prior art.
Figure 2:
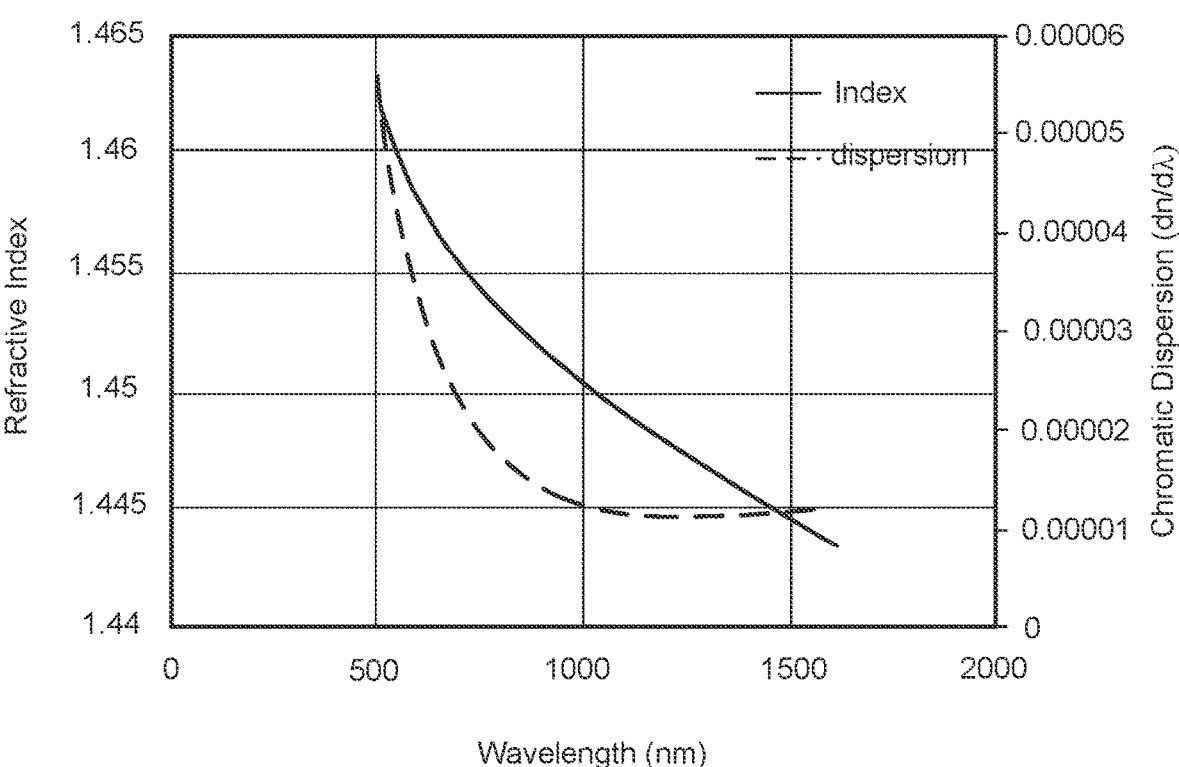
FIG. 2 illustrates a plot of refractive index and chromatic dispersion of silica versus wavelength, in accordance with the prior art.

Aspects of the present disclosure are directed to dispersive optical elements (DOEs), dispersive optical devices (DODs) such as planar waveguide circuits containing at least one DOE, and optical instruments including the same. The DOEs have a chromatic dispersion that is many times greater than the chromatic dispersion of a silica prism. With that in mind, the DODs described herein include at least one DOE. Due to the high chromatic dispersion of the DOE, the DODs described herein can separate even closely spaced wavelengths of light by an amount that is significantly greater a device containing a standard silica prism.

In general, the DODs described herein include a first material and at least one DOE embedded in the first material. The first material has a first refractive index (n1) at a target wavelength and a first chromatic dispersion (D1) at the target wavelength. The at least one DOE includes a second material containing a chromophore that is selected to disperse light at the target wavelength and which is incident on the DOE. The DOE has a second refractive index (n2) at the target wavelength and the at least one DOE has a second chromatic dispersion (D2) at the target wavelength, wherein D2 is at least 10 times greater than D1. In some embodiments D2 is at least 100, at least 1000, or even at least 10,000 times greater than D1.

The second material and chromophore may be configured such that n2 is substantially matched to n1. As used herein, the term "substantially matched" when used in reference to two refractive indices, means that the two refractive indices differ by ≤1%, such as ≤0.5%, ≤0.1%, 0.05%, 0.01%, 0.005%, or even 0.001% or less. Put differently, first and second refractive indices are "substantially matched" if the ratio of the first refractive index (n1) to the second refractive index (n2) is in the range of 0.99:1.00 to 1.01:1.00, such as 0.995:1.000 to 1.005:1.00, 0.999:1.00 to 1.001:1.000, or even 0.9995:1.0000 to 1.0005:1.0000.

The chromophore may be any suitable chromophore that can disperse light at the target wavelength. Non-limiting examples of such chromophores include electro-optic chromophores, e.g., organic nonlinear optical (ONLO) chromophores such as the known disperse red 1 (DR1) chromophore (i.e., N-Ethyl-N-(2-hydroxyethyl)-4-(4-nitrophenylazo)aniline), the known VC8 chromophore (p-diethylamino-phenyl-hexa-1,2,7-triene, 1-pentafluoro, 2,2-dicyanoethylene), the known CLD-1 chromophore (2-[4-[(E,3E)-3-[3-[(E)-2-[4-[bis[2-[tert-butyl(dimethyl)silyl] oxyethyl]amino]phenyl]ethenyl]-5,5-dimethylcyclohex-2-en-1-ylidene]prop-1-enyl]-3-cyano-5,5-dimethylfuran-2-ylidene]propanedinitrile), combinations thereof and the like.

In embodiments the at least one DOD is in the form of a planar waveguide circuit. In such instances, the first material of the DOD may form at least a part of a waveguiding layer of the planar waveguide circuit, and the at least one DOE may be arranged along a first plane extending parallel and through the waveguiding layer. In embodiments, the planar waveguide circuit includes a substrate and the waveguiding layer is on the substrate. In such embodiments, the at least one DOE has a geometric shape, such as a prism shape. In some instances, the planar waveguide circuit may include a plurality of DOEs that are arranged in series with each other and which are each arranged along the first plane.

Other aspects of the present disclosure relate to optical instruments that include a source and a DOD. The source is configured to provide an input signal that includes at least a carrier signal at a first wavelength W1 and a sideband to the carrier signal at a second wavelength W2, wherein W2 is offset above or below W1, e.g., by an amount less than or equal to 1 nm, 0.5 nm, 0.1 nm or even 0.05 nm. The DOD is configured to receive the input signal, and comprises a first material having a first refractive index (n1) at W1 and a first chromatic dispersion (D1) at W1. The DOD further includes at least one DOE embedded in the first material, wherein the at least one DOE comprises a second material containing a chromophore. The DOE has a second refractive index (n2) at W1 that is substantially matched to n1. The at least one DOE has a second chromatic dispersion (D2) at W1, wherein D2 is at least 10 times greater than D1.

In some embodiments the at least one DOD may be a planar waveguide circuit, wherein the first material forms at least a portion of a waveguiding layer of the planar waveguide circuit. In such instances the DOD may include one or a plurality of DOE's wherein each of the one or a plurality of DOE's are arranged along a first plane that extends through the waveguiding layer. When the DOD includes a plurality of DOEs, the DOEs may be arranged in series with respect to one another along the first plane.

Figure 3:
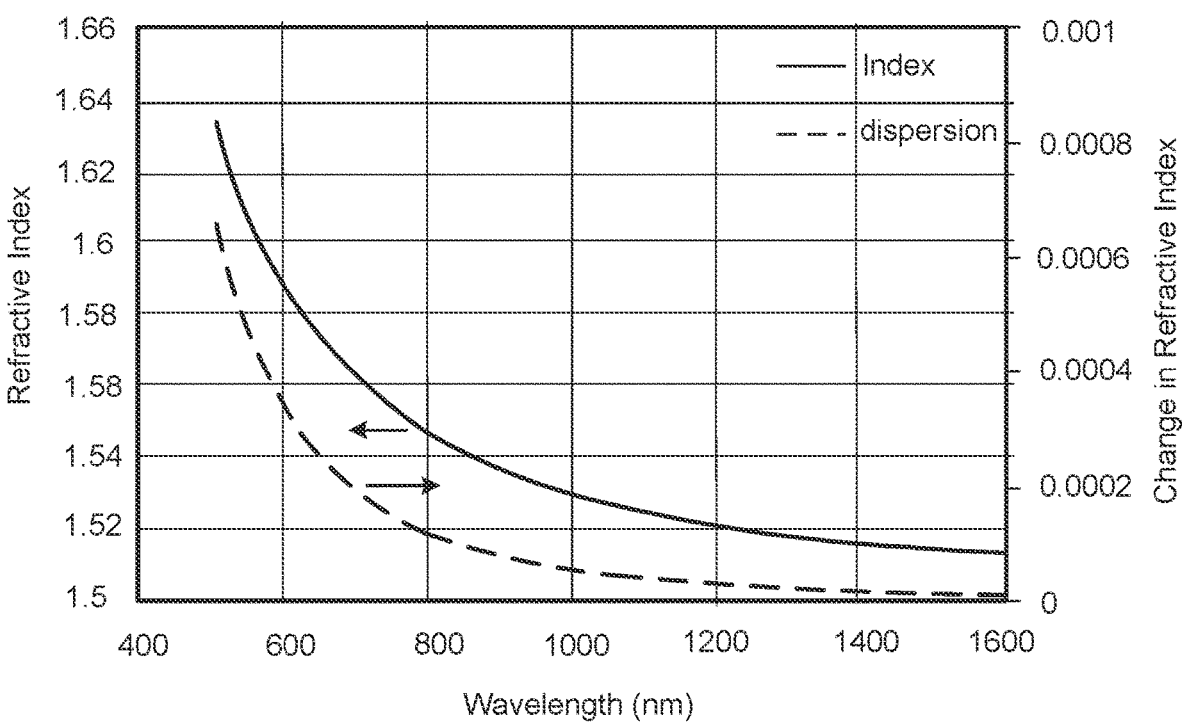
FIG. 3 illustrates a plot of refractive index and chromatic dispersion versus wavelength, for the disperse red 1 (DR1) chromophore in polymethylmethacrylate (PMMA), in accordance with the prior art.

As noted in the background, optical elements such as conventional silica prisms can adequately separate wavelengths of light that are separated by 1 nm or more. Due to their low chromatic dispersion, however, silica prisms are generally unable to separate wavelengths of light that are more closely spaced, i.e., wavelengths that are separated by less than 1, 0.5, 0.1, 0.5, 0.1, 0.05, 0.01, 0.005, 0.001, 0.0005, or even 0.0001 nm) by an amount that is sufficient for many applications, such as signal intelligence. With that in mind, it has been shown that optical elements with a chromatic dispersion greater than that of silica can be created by dispersing the known DR1 chromophore (N-Ethyl-N-(2-hydroxyethyl)-4-(4-nitrophenylazo)aniline) in a host material of polymethylmethacrylate. This is demonstrated by FIG. 3, which illustrates a plot 300 of refractive index and chromatic dispersion versus wavelength for light (traveling in air) that is incident on an optical element that includes the DR1 chromophore dispersed polymethylmethacrylate (PMMA). While the increased chromatic dispersion of such elements can increase separation of closely spaced wavelengths of light, the degree of separation (angular difference) produced by such elements is still insufficient for many applications, particularly when the wavelengths to be separated are very closely spaced (e.g., less than 1, 0.05, 0.01, 0.005, 0.001, 0.0005, or even 0.0001 nm or less).

With the foregoing in mind, the inventors recognized that the chromatic dispersion (and thus, angular separation) of an on optical element may be increased (relative to DR1 in PMMA) in several ways. First, the inventors recognized that increasing the loading of a chromophore in a host material of an optical element can increase chromatic dispersion. Second, chromatic dispersion may be increased by using an optical element that includes a chromophore with an absorption maximum at a longer wavelength than DR1. And third, chromatic dispersion may be increased by matching or at least substantially matching the refractive index of the optical element to the surrounding medium (i.e., the medium in which light is traveling when it is incident on the optical element). The inventors also recognized that such options may be combined to result in an optical element with a chromatic dispersion of at least 0.001 per nm.

Figure 4:
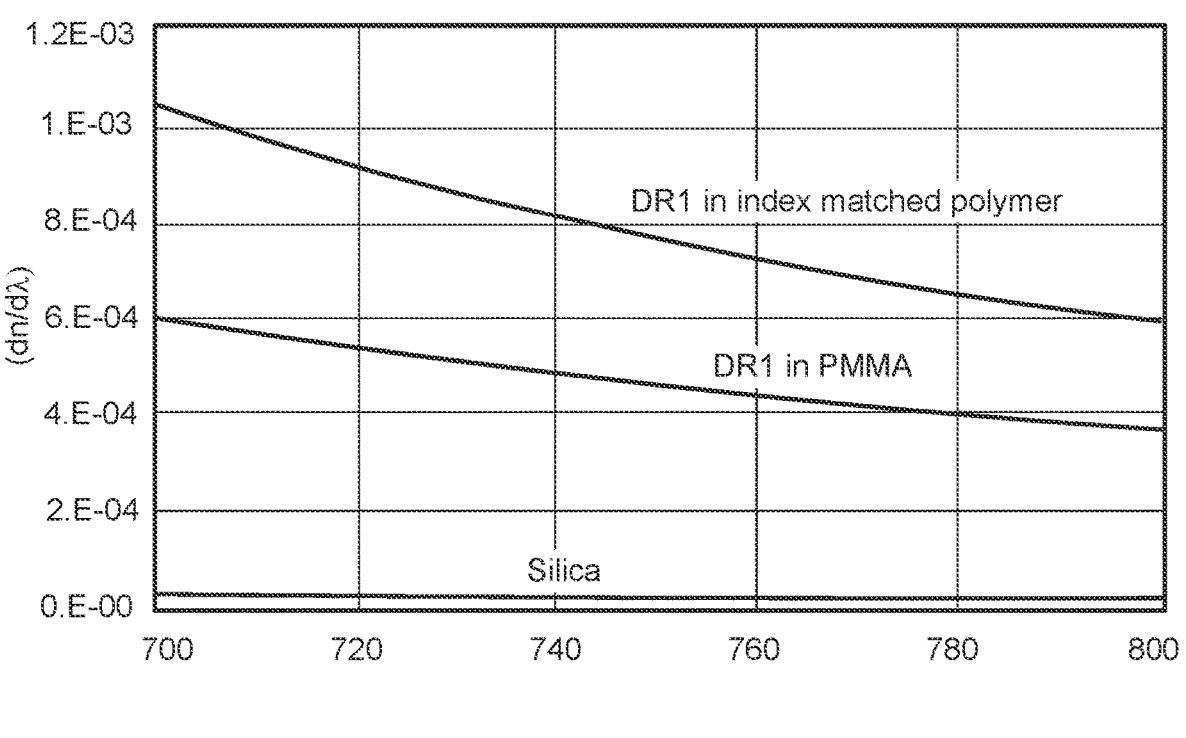
FIG. 4 is a plot of ratio of angular separation versus ratio of refractive index, consistent with the present disclosure.
Figure 5A:
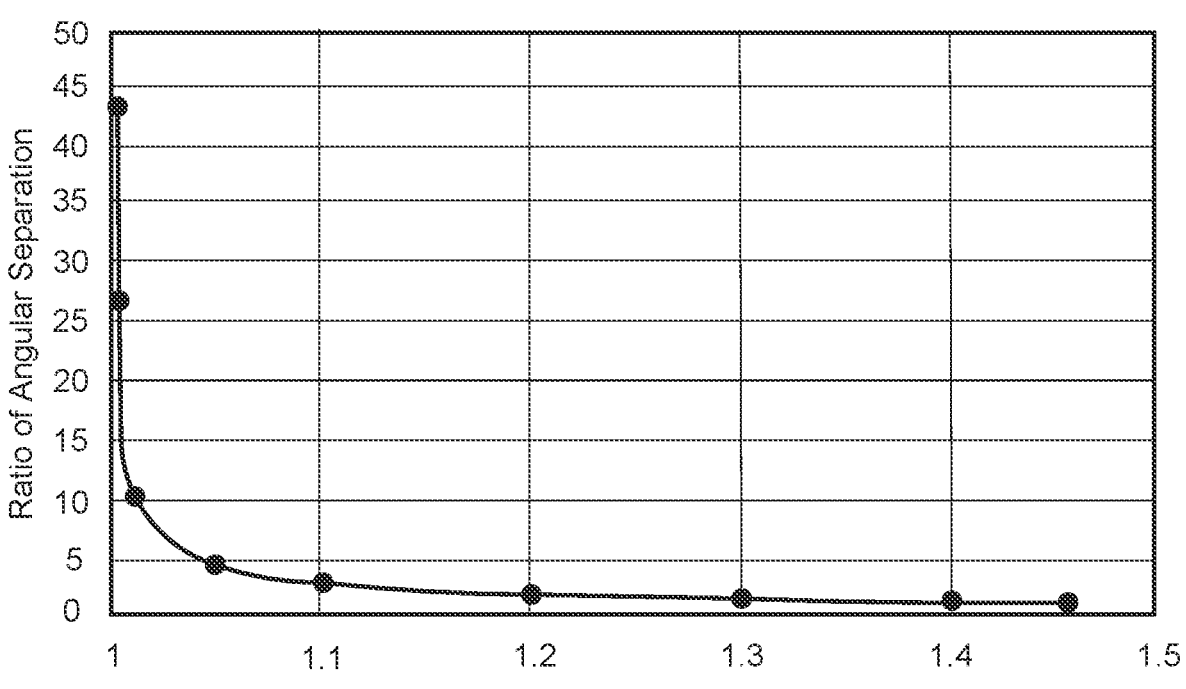
FIG. 5A is a plot of ratio of angular separation versus ratio of refractive index
Figure 5B:
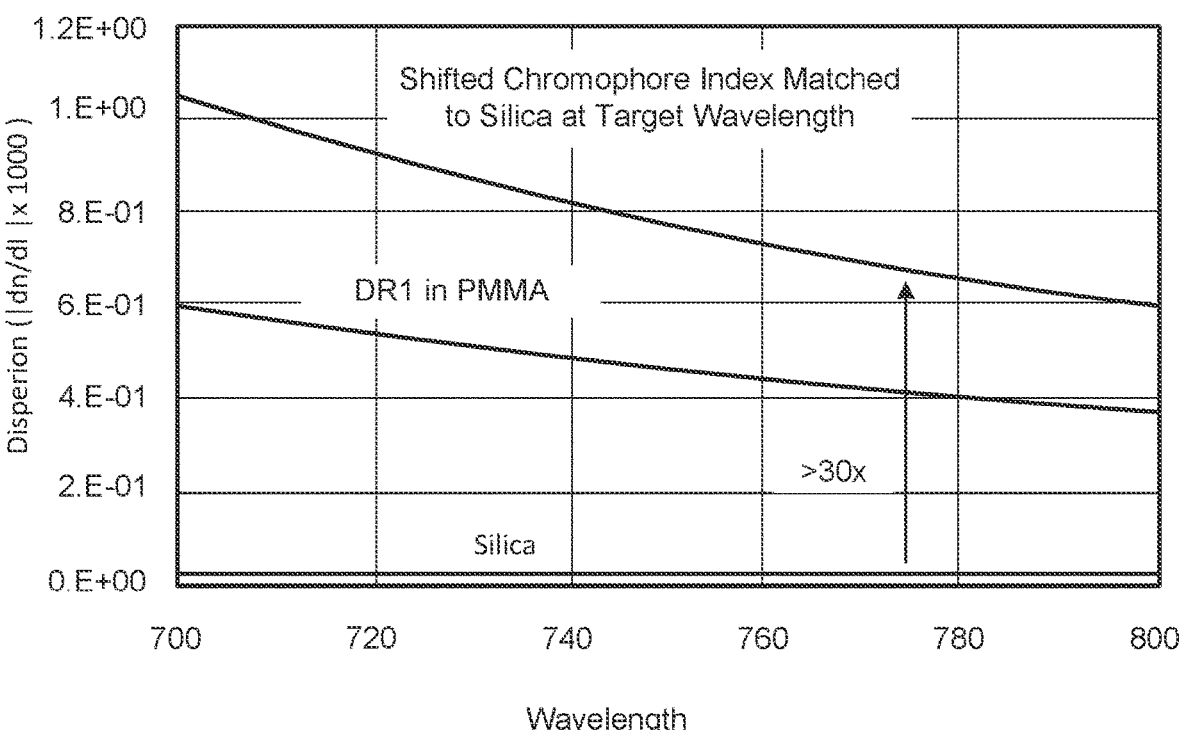
FIG. 5B is a plot of chromatic dispersion versus wavelength for silica, a DR1 chromophore in PMMA, and a shifted chromophore in a DOE index matched to silica, consistent with the present disclosure.

To demonstrate those concepts, reference is made to FIGS. 4, 5A, and 5B. FIG. 4 is a plot 400 of chromatic dispersion versus wavelength for an optical element of silica, an optical element of DR1 in PMMA, and an optical element of a chromophore with an similar absorption strength but with absorption maximum at a longer wavelength (600 nm) than DR1 in PMMA (hereinafter, a "shifted chromophore"). This "shifted chromophore" is representative of the behavior of the VC8 chromophore. As can be seen, the optical element that included a shifted chromophore in PMMA had a chromatic dispersion of about $1 \times 10^{-3}$ at 700 nm, relative to $6 \times 10^{-4}$ exhibited by the optical element of DR1 in PMMA and less than $3.3 \times 10^5$-exhibited by the optical element of silica. That is, the optical element containing the shifted chromophore exhibited an optical dispersion more than 30 times the optical dispersion of the silica optical element at 700 nm. Thus, by using an appropriately selected chromophore, the DOEs described herein can exhibit an optical dispersion that is many times greater (e.g., 10, 20, 30, 40, 50, etc. times greater) than that of a silica prism.

FIG. 5A illustrates a plot 500 of angular separation ratio (at a given index ratio relative to the silica-air index ratio of 1.455361) versus ratio of refractive index between an optical element and the surrounding medium (i.e., the medium in which light is traveling when it impinges on the optical element). As shown, as the ratio of refractive index approaches 1:1 the ratio of angular separation increases dramatically, with a ratio of refractive index ratio of 1.05:1 to 0.95:1 providing a ratio of angular separation of the index matched optical element to of ≥5, ≥15, ≥25, or even ≥30. This demonstrates that when the (second) refractive index of the optical element differs from the (first) refractive index by: 5% (e.g., ≤2%, ≤1%, or even ≤0.5%), the angular separation that can be obtained with the optical element is substantially increased.

The impact of matching or substantially matching the refractive index of an optical element to the surrounding medium is further demonstrated in FIG. 5B, which plots chromatic dispersion versus wavelength for light traveling in silica that is incident on: (1) an optical element of silica; (2) an optical element of the DR1 chromophore in a host material (PMMA) with a refractive index that is not substantially index matched to silica at a target wavelength; and (3) an optical element that includes the DR1 chromophore in a host material and which has a refractive index that is matched to refractive index of silica at the target wavelength (hereinafter, "index matched optical element"). As can be seen, the index matched optical element can exhibit a chromatic dispersion of $1 \times 10^{-3}$/nm for light at about 700 nm, which is more >30 times the chromatic dispersion of the silica optical element.

With the foregoing in mind, an example can be considered in which red light at 700 nm and 700.05 nm is traveling through silica when it is incident on an optical element in the form of a prism that includes a host material and a chromophore, wherein the optical element has a chromatic dispersion of $1.0 \times 10^3$/nm. In that example the red light at 700 nm incident on the optical element at 88° would leave the optical element at 88°. In contrast, red light at 700.05 nm incident on the optical element at 88° would leave the optical element at 87.91958°, resulting in an angular separation of 0.08042° relative to the red light at 700 nm. That degree of angular separation of larger than the separation (0.06771°) seen between red (700 nm) and orange (630 nm) light that is incident on an interface between air and a glass prism, and is large enough to be useful for a variety of applications.

Moreover, the chromatic dispersion of the optical element could be further increased by at least substantially matching the optical index of the optical element to the surrounding medium at a target wavelength of 700 nm, resulting in even greater angular separation between the 700 nm and 700.05 nm light.

As noted above, index matching (or substantial index matching) a DOE to the surrounding medium and appropriate selection of a chromophore can each independently increase the optical dispersion exhibited by the DOE. When used in combination, such features can even further increase the optical dispersion of the DOE. More specifically, when a chromophore containing polymer is used as the DOE, index matching of the DOE to the surrounding medium can increase the optical dispersion of the DOE to an amount that is greater than or equal to 50, 100, 250, 500, 750, 1000, or even 10,000 times the optical dispersion exhibited by a silica prism.

Figure 6:
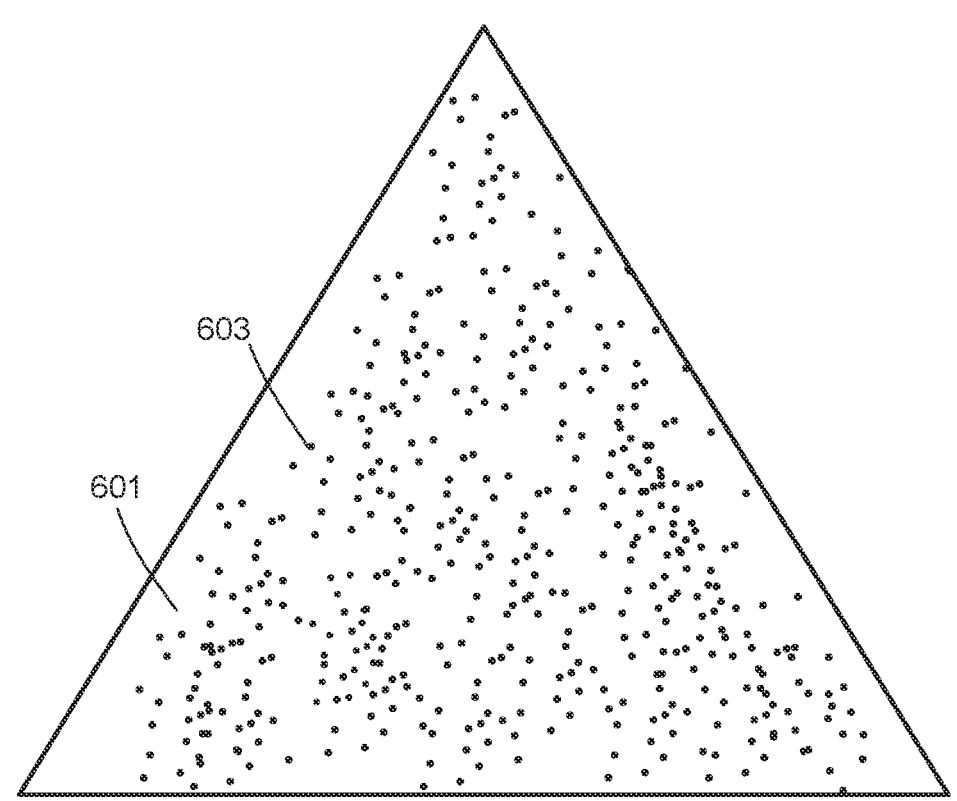
FIG. 6 depicts one example of a dispersive optical element consistent with the present disclosure.
Figure 7A:
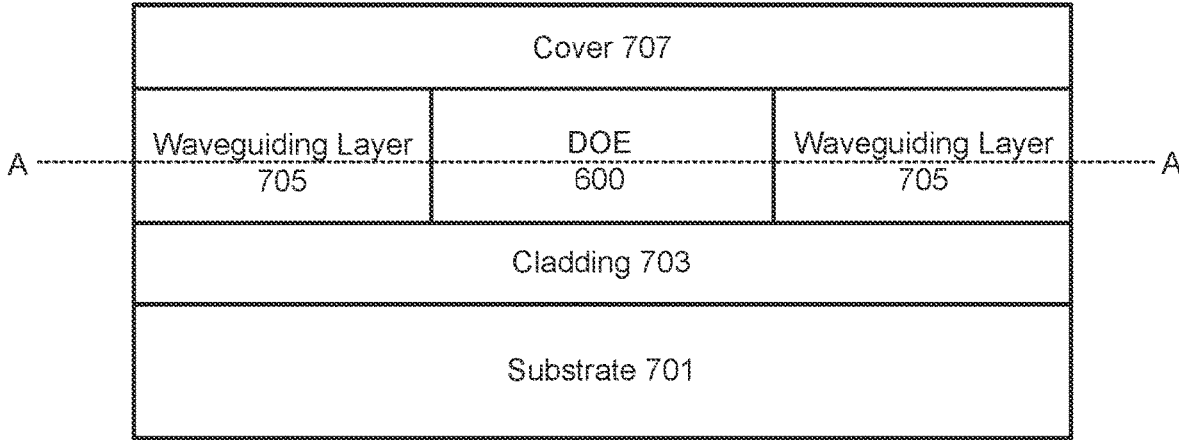
FIG. 7A is a cross sectional block diagram of one example of a dispersive optical device (DOD) consistent with the present disclosure.
Figure 7B:
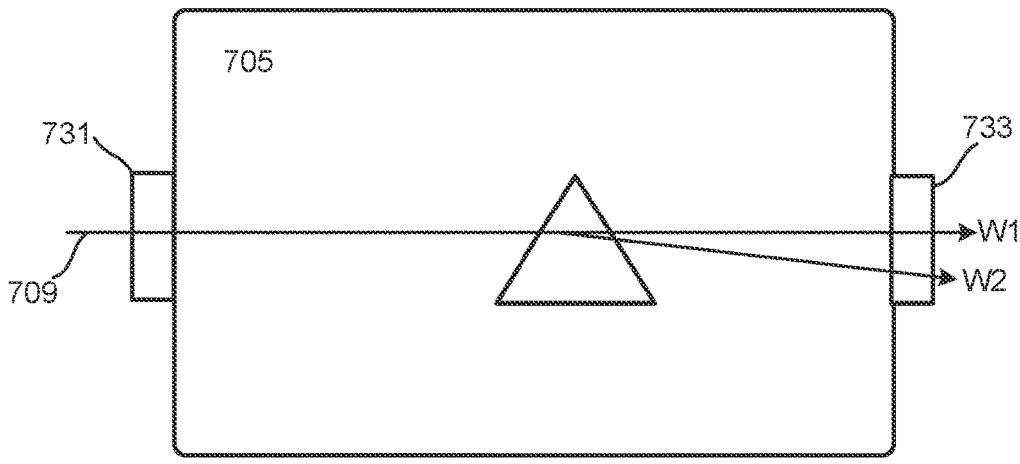
FIG. 7B is a schematic top down view of the DOD of FIG. 7A

FIG. 6 depicts one example of a dispersive optical element (DOE) 600 consistent with the present disclosure. As shown, DOE 600 includes a host (second) material 601 and a chromophore 603. It should be understood that the chromosphore 603 is a substantially and homogeneously solubilized in the host material 601. Thus the "dots" illustrated in FIG. 6 are meant to show a different material substantially homogeneously solubilized in the host material. The host material 601 and chromophore are selected such that DOE 600 has a (second) refractive index n2 that is matched or at least substantially matched to a (first) refractive index n1 of another (first) material at a target wavelength. The first material is generally disposed outside of the structure of DOE 600 (as illustrated in FIGS. 7A and 7B, described below). In some embodiments the first material is silica, and the DOE has a refractive index n2 at a target wavelength of 700 nm that is matched or substantially matched to a refractive index n1 of silica at 700 nm, i.e., about 1.45.

With the foregoing in mind, any combination of host material and chromophore may be used, provided that DOE 600 has a refractive index n2 that is matched or substantially matched to the refractive index of the surrounding medium from which DOE 600 is to receive light. In instances where DOE 600 is (e.g., consists of) a host polymer that contains a chromophore, the refractive index of DOE 600 as a function of wavelength is given by the following one-term Sellmeier equation:

$$n^2(\lambda) = 1 + \frac{B}{1 - C\left(\frac{\lambda_{max}}{\lambda}\right)^2}$$

Where B and C are material specific parameters, $\lambda_{max}$ is the wavelength at which the chromophore has an absorption maximum, and X is the incident wavelength.

Without limitation, host material 601 preferably is a polymer or other material that has a refractive index that is less than the refractive index of silica at 700 nm, i.e., less than 1.45. Non-limiting examples of such materials include fluorinated homopolymers such as trifluoroethyl methacrylate (TFEMA), tetrafluoropropyl methacrylate (TFPMA) and hexafluoropropyl methacrylate (HFPMA). While such materials are preferred, the present disclosure is not limited thereto and other materials may be used as or in host material 601. Indeed, host material 601 may be any suitable polymer material that has a refractive index less than 1.45 at 700 nm. Due to the limited solubility of chromophores in fluorinated homopolymers, when a fluorinated homopolymer such as TFEMA, TFPMA, and/or HFPMA is used in host material 601, host material 601 may also contain one or more solubilizing monomers to facilitate incorporation of chromophore 603 in a desired amount. One example of a solubilizing monomer that may be used is hydroxyethyl methacrylate (HEMA), but other solubilizing monomers may be used. In this context, "solubilizing monomer" refers to monomeric materials that have a higher solubility limit for chromophore 603 a fluorinated polymer that is used in host material 601.

Any suitable chromophore may be used as chromophore 603. Non-limiting examples of such chromophores include DR1 and VC8 (p-diethylamino-phenyl-hexa-1,2,7-triene, 1-pentafluoro, 2,2-dicyanoethylene). Other chromophores may also be used. For example, in embodiments chromophore 603 is or includes a chromophore that has an absorption maximum at a longer wavelength than DR1, such as but not limited to VC8. For the sake of clarity and ease of understanding the present disclosure will focus on embodiments in which a single chromophore is used as chromophore 603, but it should be understood that multiple chromophores may also be used.

The amount of chromophore 603 in host material 601 is not limited, and any suitable amount of chromophore 603 may be used. In embodiments, chromophore 603 is present in host material 601 in an amount ranging from greater than 0 to about 50 weight %, such as from greater than 0 to about 40, from greater than 0 to about 30, from greater than 0 to about 20, or even from greater than 0 to about 15 weight %, relative to the total weight of DOE 600.

In non-limiting embodiments, DOE 600 includes VC8 as chromophore 603, dispersed in a host material 601 of a terpolymer. The monomers making up the terpolymer included 20 weight % TFEMA, 65 weight % TFPMA, and 15 weight % HEMA. VC8 was present in an amount of 8 weight %, relative to the total weight of the host material 601. In other non-limiting embodiments, DOE 600 includes 9.7% by weight VC8 as chromophore 603 dispersed in a host material 601 of 14.4 weight % TFEMA, 80.6 weight % TFPMA, and 5 weight % HEMA. Both of those examples were index matched or substantially index matched to silica at 1550 nm at a temperature of 50-60° C.

For the sake of example DOE 600 is illustrated in FIG. 6 in the form of a prism, but it should be understood that the DOEs described herein are not limited to that shape. Indeed, DOE 600 (and the other DOEs described herein may have any suitable shape, such as a geometric or irregular shape). In embodiments, the DOE 600 described herein have a geometric shape, such as but not limited to a pyramid, circular, ellipsoidal, triangular, quadrilateral, pentagonal, hexagonal, or other suitable geometric shape.

The DOEs described herein may be utilized in or with one or more dispersive optical devices (DODs). In that regard reference is made to FIGS. 7A and 7B, which are a cross sectional block diagram and top down views, respectively, of one example of a DOD 700 consistent with the present disclosure. In the embodiment of FIGS. 7A and 7B, DOD 700 is in the form of a planar waveguide circuit, but it should be understood that the DOEs described herein may be used in other types of devices. For the sake of clarity, various features of a planar waveguide circuit (e.g., electrodes, contacts, etc.) that would be understood but those of ordinary skill are not shown in FIGS. 7A and 7B.

As best shown in FIG. 7A, DOD 700 includes a substrate 701, a cladding layer 703 formed on (e.g., directly on) substrate 701, a waveguiding layer 705 formed on (e.g., directly on) cladding 703, and a cover layer 707 formed on (e.g., directly on) waveguiding layer 705. A first plane A extends longitudinally through waveguiding layer 705. In this embodiment, a single DOE 600 is embedded (e.g., disposed within a recess or notch) in waveguiding layer 705.

Substrate 701 may be any suitable substrate for a planar waveguide circuit. One example of a suitable material that may be used as or in substrate 701 is silicon, but other materials (e.g. SiO₂) may also be used.

Cladding layer 703 may be formed from any cladding material that may be suitably used in a planar waveguide. One example of a suitable material that may be used as or in cladding layer 703 is fused silica, but other materials may also be used. For example, cladding layer 703 may be or include one or more silicon oxides, such as but not limited to SiO and $SiO_2$. Alternatively or additionally, cladding layer 703 may be polymeric. In embodiments, cladding layer 703 may be omitted, in which case waveguiding layer 705 may be formed directly on a surface of substrate 701.

Waveguiding layer 705 is generally configured to function as a waveguide for an input signal 709, as generally shown in FIG. 7B. In that regard, waveguiding layer 705 may be formed from or include any suitable material that can function for that purpose. Non-limiting examples of suitable materials that may be used as or in waveguiding layer 705 include silica ($SiO_2$), transparent glasses, combinations thereof, and the like. The waveguiding layer 705 may be doped with one or more dopants such as titanium oxide, tantalum oxide, tin oxide, niobium oxide, zirconium oxide, ytterbium oxide, lanthanum oxide, aluminum oxide, combinations thereof, and the like. Without limitation, waveguiding layer 705 is preferably formed from or includes silica, in which case DOD 700 may be understood to be a planar silica waveguiding circuit.

In operation waveguiding layer 705 is configured to receive an input signal 709 via an optical input 731, as best shown in FIG. 7B. The input signal 709 may include a carrier signal at a wavelength W1, and a sideband to the carrier signal at a wavelength W2 that is offset above and/or below W1. In that regard, the (first) material of waveguiding layer 705 may be configured to have a first refractive index $n_1$ at W1. For example, when waveguiding layer 705 is silicon and W1 is 700 nm, n1 may be about 1.45. W1 is not limited to 700 nm and n1 is not limited to about 1.45, however, and any suitable W1 and n1 may be used.

As described above DOE 600 is embedded within waveguiding layer 705. In this context, the term "embedded" means that a receptacle such as a notch or recess is formed in or through waveguiding layer 705, and is configured to receive DOE 600 therein such that the DOE is optically coupled to at least a portion of the waveguiding layer. In embodiments, the receptacle has a first geometry that is complementary to the (second) geometry of DOE 600. For example, when DOE 600 has a first cross sectional shape (e.g., an irregular shape or a geometric shape such as a circular, ellipsoidal, triangular, prism, quadrilateral, etc., shape), the receptacle formed in or through waveguiding layer 705 may have a second shape that is configured to receive the first shape therein. In embodiments, the receptacle in or through waveguiding layer 705 has a shape and depth corresponding to the shape and height of DOE 600, such that an upper surface of DOE 600 is coplanar or substantially coplanar with an upper surface of wave guiding layer 705, as shown in FIG. 7A. In any case, DOE 600 may be understood to be arranged along the first plane A extending parallel to and through waveguiding layer 705.

Cover layer 707 may be formed from any suitable material. Non-limiting examples of suitable materials that may be used as or in cover layer 707 include the materials noted above for cladding layer 703. Other materials known in the art as suitable for use in a cover layer of a planar waveguide may also be used.

DOD 700 may be manufactured in any suitable manner. For example, in embodiments DOD 700 is in the form of a planar silica waveguide circuit. In such embodiments DOD 700 may be produced by photolithography methods using a silicon wafer substrate. For example, a silicon wafer substrate may be provided as substrate 701. An under-cladding of fused silica may be applied to the silicon wafer substrate as a cladding layer 703 via known methods. A waveguiding layer 705 of doped silicon may then be formed on the surface of cladding layer 703. A cover layer 707 of fused silica may then be provided on the waveguiding layer. A photomask including the inverse of the shape of DOE 600 may be applied to the surface of cover layer 707. The resulting structure may then be subject to photolithography to remove a portion of cover layer 707 and waveguiding layer 705 in the shape of DOE 600, resulting in the production of a void. Following such removal the void may be filled to the level of the upper surface of the waveguiding layer with an uncured mixture of a host polymer and a chromophore. The mixture may be cured in any suitable manner to form DOE 600 within the void. The remainder of the void (above DOE 600) may then be filled or covered, e.g., by additional material of cover layer 707, and/or by a preformed cover plate.

DOD 700 may further include an optical input 731 (as noted above) and an optical output 733. The optical input 731 and optical output 733 are each optically coupled to waveguiding layer 705. Waveguiding layer 705 is configured to convey an input signal 709 received from optical input 731 to and through at least a portion of DOE 600, wherein the input signal 709 includes a carrier signal at a wavelength W1 and at least one sideband at a wavelength W2 that is offset above or below W1. In embodiments, W2 may differ from W1 by less than or equal to about 1 nm, 0.5 nm, 0.1 nm, 0.005, 0.001, 0.0005, or even 0.0001 nm. Because DOE 600 is at least substantially index matched to the material of waveguiding layer 705 at W1, the carrier signal at W1 may pass through DOE 600 without (or without substantially) being refracted. However, because DOE 600 is not index matched to the material of waveguiding layer 705 at W2, the sideband at W2 will be refracted by DOE 600, e.g., by an amount related to the high chromatic dispersion of DOE 600 as discussed above. After DOE 600, the separated carrier signal at W1 and sideband at W2 may be conveyed by waveguiding layer 705 to optical output 733

For the sake of clarity and ease of understanding, DOD 700 is illustrated in FIGS. 7A and 7B as including a single DOE consistent with the present disclosure. The DODs described herein are not limited to such a configuration, however, and may include any suitable number of DOEs. For example, the DODs described herein may include a plurality (e.g., 2, 3, 4, 5 . . . 10 . . . 15 . . . 20 . . . or more DOEs). In such embodiments, the plurality of DOEs may each be embedded within a waveguiding layer, such that they are arranged in series with each other and are each arranged along a first plane that extends parallel to a through the waveguiding layer. As used herein the phrase "arranged in series" when used in conjunction with two or more DOEs means that a (second) DOE is arranged such that it can receive light that has passed through a (first) DOE, or that a (first) DOE is arranged such that light passing through it is incident on a (second) DOE.

Figure 8:
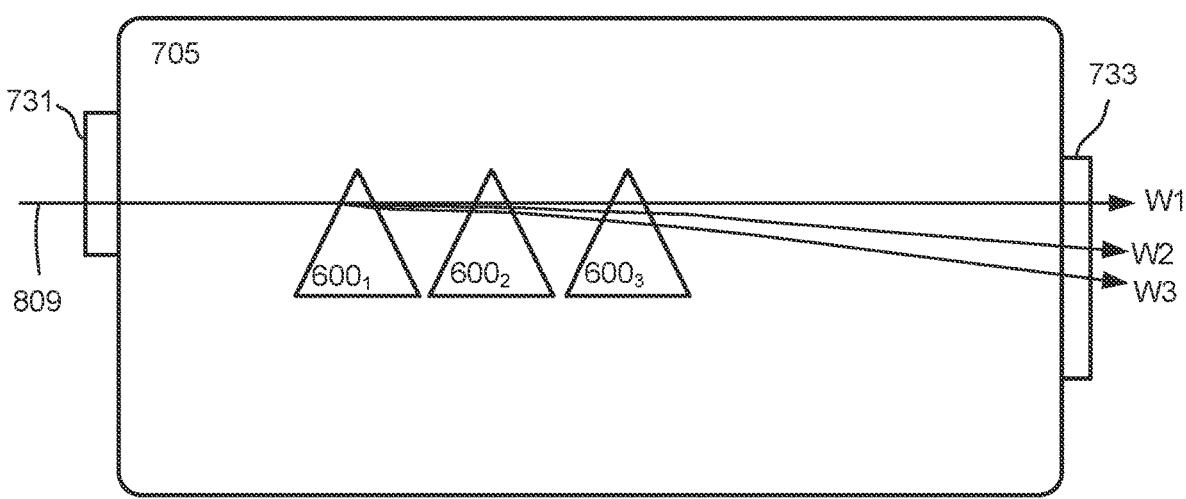
FIG. 8 is a schematic diagram of another example of a DOD consistent with the present disclosure.

To illustrate the concept reference is made to FIG. 8, which is a top down view of another example of a DOD 800 consistent with the present disclosure. It is noted that the cross sectional structure of DOD 800 is substantially the same as that shown in FIG. 7A for DOD 700, except for the provision of a plurality of receptacles in or through waveguiding layer 705. Thus, a cross sectional diagram of DOD 800 is not provided. As shown, DOD 800 includes a waveguiding layer 705 that is formed on a cladding layer such as cladding layer 703 or directly on the surface of a substrate such as substrate 701 as described previously. Unlike DOD 700, however, DOD 800 includes multiple DOEs embedded within waveguiding layer 705. For the sake of illustration, DOD 800 is shown as including two DOEs $600_1$, $600_2$, $600_3$ but any number of DOEs may be included as discussed above.

The nature and configuration of DOEs $600_1$, $600_2$, $600_3$ are generally the same as DOE 600 in FIG. 7, and so are not described again in the interest of brevity. As shown in FIG. 8, DOEs $600_1$, $600_2$, $600_3$ are arranged in series with one another such that light exiting one DOE is incident on another DOE. More specifically, DOD 800 includes an optical input 731 configured to receive an input signal 809. In this example input signal 809 includes a carrier signal with a wavelength W1, a first sideband at a wavelength W2, and a second sideband at a wavelength W3, wherein W2 and W3 are each offset above or below W1, e.g., by ≤about 1 nm, 0.5 nm, 0.1 nm, 0.05, 0.01, 0.005, 0.001, 0.0005, or even 0.0001 nm. The input signal 705 is conveyed by waveguiding layer 705 to first DOE $600_1$. Because first DOE $600_1$ is at least substantially index matched to the material of waveguiding layer 705 at W1, the carrier signal at W1 may pass through first DOE $600_1$ without (or without substantially) being refracted. However, because DOE $600_1$ is not index matched to the material of waveguiding layer 705 at W2 and W3, the first and second sidebands at W2 and W3 will be refracted and separated by DOE $600_1$, e.g., by an amount related to the high chromatic dispersion of DOE $600_1$ as discussed above. As a result, the components of input signal 809 will be separated by a first degree after they pass through DOE $600_1$.

Downstream of DOE $600_1$ the components of input signal 809 are conveyed by waveguiding layer 705 to impinge on and pass through DOE $600_2$. Like DOE $600_1$, DOE $600_2$ is at least substantially index matched to the material of waveguiding layer 705 at W1, but is not substantially index matched to the material of waveguiding layer 705 at W2 and W3. As a result, the carrier signal at W1 may pass through DOE $600_2$ without (or without substantially) being refracted, but the sidebands at W1 and W2 will be refracted and further separated from each other and from the carrier by DOE $600_2$. As a result, the components of input signal 809 will be separated from each other by a second degree after they pass through DOE $600_2$, wherein the second degree is greater than the first degree.

Downstream of DOE $600_2$ the components of input signal 809 are conveyed by waveguiding layer 705 to impinge on and pass through DOE $600_3$. Like DOEs $600_1$ and $600_2$, DOE $600_3$ is at least substantially index matched to the material of waveguiding layer 705 at W1, but is not substantially index matched to the material of waveguiding layer 705 at W2 and W3. As a result, the carrier signal at W1 may pass through DOE $600_2$ without (or without substantially) being refracted, but the sidebands at W1 and W2 will be refracted and further separated from each other and from the carrier by DOE $600_3$. As a result, the components of input signal 809 will be separated from each other by a third degree after they pass through DOE $600_3$, wherein the third degree is greater than the second degree and the first degree. As may be appreciated, additional DOEs may be employed to even further separate the components of the input signal. In any case, the separated components of the input signal 809 may be conveyed by waveguiding layer 705 to optical output 733.

For the sake of illustration DOD 800 is illustrated as including three DOEs that are of the same prism shape, size, and general configuration. Such a configuration is not required, however, and the DODs described herein may be configured differently. For example, in embodiments the DODs described herein may include a plurality (e.g., 2, 3, 4, 5 etc.) or more DOEs, wherein the DOEs are identical to one another. In other embodiments the DODs may include a plurality of DOEs, wherein at least one (e.g., a first) DOE in the DOD differs from at least one other (e.g., a second) DOE in size, shape, material configuration, or a combination thereof.

As may be appreciated from the foregoing, the DODs described herein can be configured such that they can separate wavelengths of light, even if such wavelengths are very close to one another. For example and as discussed above, the DOD's described herein can include one or a plurality of DOEs, and is configured to separate a first wavelength W1 from a second wavelength W2, wherein W1 and W2 differ from one another by ≤about 1 nm, 0.5 nm, 0.1 nm, 0.05 nm, 0.001 nm, 0.0005 nm, 0.0001 nm, or even 0.00005 nm or less. As a result, the DODs described herein can enable the production and development of novel optical instruments that can analyze narrowly spaced wavelengths of light that have been separated by one or more DODs and/or DOEs consistent with the present disclosure.

Table 1 provides indication of how a single DOE can separate closely spaced wavelengths of light. If multiple DOEs are used sequentially, the effect is additive for the smaller angle change. Thus, for example, 7 DOEs arranged in series may produce approximately 7× the angle change, with the angle change becoming less linear as the change in angle increases.

consistent with the present disclosure. As shown, optical instrument 900 includes a source 901 that is configured to provide an input signal, and a DOD 910 configured to receive the input optical signal. Instrument 900 may optionally include optics 911, a detector 913, and a signal processor downstream of the at least one DOD 910. As may be appreciated, instrument 900 may form all or a part of a spectrum analyzer. While such an instrument is one preferred end use of the DOEs and DODs described herein, it should be understood instrument 900 may be configured differently.

Source 901 is generally configured to provide an input signal to a DOD. The input signal may include multiple frequencies/signals. For example, the input signal may include a carrier signal at a first wavelength (W1), and a sideband to the carrier signal that is at a frequency W2, wherein W2 is shifted to a lower or higher wavelength relative to W1. In that regard any suitable source may be used as source 901. Without limitation, in embodiments source 901 includes a carrier source 903, an input RF source 905, a modulator 907, and a wavelength converter 909.

Carrier source 903 may be any suitable source of a carrier signal. In embodiments, carrier source 903 is in the form of a laser that is configured to produce light at a single first (carrier) wavelength. However, such a configuration is not required and carrier source may be configured to provide a carrier signal that includes light at a first wavelength, along with light at other wavelengths. Without limitation, in embodiments carrier source 903 is a low relative intensity noise (RIN) laser that is configured to provide a narrow bandwidth optical carrier signal at a first wavelength W1, such as but not limited to 1550 nm light.

Any suitable RF source may be used as input RF source 905. Non-limiting examples of suitable RF sources that may be used include RF signal generators, RF modulators, RF antenna feeds, combinations thereof and the like. Without limitation, input RF source 905 is in the form of a microwave or other RF source that is configured to provide an input RF signal for modulation with the carrier signal provided by carrier source 903. RF source 905 is the signal that may include frequencies of interest to be detected.

The modulator 907 (e.g., an electrooptic modulator) is configured to receive and modulate a carrier signal from

TABLE 1

| | angular separation (Δ angle) of closely spaced wavelengths of light by a single DOE based on refractive index ratio and wavelength separation | | | | | |
|---|---|---|---|---|---|---|
| Refractive Index Ratio | Δ angle (1 nm wavelength difference) | Δ angle (0.5 nm wavelength difference) | Δ angle (0.1 nm wavelength difference) | Δ angle (0.05 nm wavelength difference) | Δ angle (0.01 nm wavelength difference) | Δ angle (0.005 nm wavelength difference) |
| 1 | 1.24922775 | 0.698167178 | 0.15783222 | 0.080416693 | 0.01634048 | 0.008186892 |
| 1.001 | 0.88647666 | 0.469929157 | 0.09929857 | 0.05002495 | 0.01006675 | 0.005037288 |
| 1.01 | 0.37932083 | 0.191853994 | 0.0387362 | 0.019391411 | 0.00388203 | 0.001941249 |
| 1.05 | 0.16840416 | 0.084433192 | 0.01692393 | 0.008464308 | 0.00169324 | 0.000846642 |
| 1.1 | 0.1129213 | 0.05654664 | 0.01132315 | 0.005662438 | 0.00113263 | 0.000566322 |
| 1.2 | 0.07171001 | 0.035886795 | 0.00718246 | 0.003591547 | 0.00071836 | 0.000359183 |
| 1.3 | 0.05290933 | 0.026472171 | 0.00529724 | 0.002648795 | 0.00052979 | 0.000264895 |
| 1.4 | 0.04167235 | 0.020847473 | 0.0041713 | 0.002085765 | 0.00041717 | 0.000208587 |
| 1.455361 | 0.03715215 | 0.018585299 | 0.00371854 | 0.001859361 | 0.00037189 | 0.000185944 |

With the foregoing in mind another aspect of the present disclosure relates to optical devices that include or utilize one or more DOEs or DODs consistent with the present disclosure. In that regard reference is made to FIG. 9, which is a block diagram of one example of an optical instrument carrier source 903 with an input RF signal provided by input RF source 905. In embodiments, during such modulation the input RF signal changes the amplitude of the carrier signal and causes the production of at least one sideband that is shifted above and/or below the carrier signal by the frequency of the RF signal. For example, if the carrier signal is at 1550 nm and the input RF signal is at 12.5 gigahertz (GHz), the output of modulator 907 will include the carrier signal at 1550 nm as well as sidebands in the form of light at 1550.1 nm and 1549.9 nm.

The light output from modulator 907 (i.e., the carrier and sidebands) may then be supplied to wavelength converter 909. In general, wavelength converter 909 is configured to receive and convert the all the components of an optical signal. In some embodiments, wavelength converter 909 is a frequency doubler that is configured to double the frequency (i.e., half the wavelength) of all components of the signal received from modulator 907, so that the sideband wavelengths are within a range (e.g., 700 to 800 nm, as illustrated in FIG. 5B) to maximize dispersion while minimizing optical power losses (absorption). In other embodiments, the carrier source may include a laser having a fundamental frequency that is within the range illustrated in FIG. 5b, and thus, the wavelength converter may be omitted.

DOD 910 is configured in the same manner as DODs 700, 800 described above, and thus its construction will not be described in detail again. In embodiments, DOD 910 is in the form of a planar waveguide circuit that of DOEs that are arranged in series with one another and along a plane extending parallel and through a waveguiding layer thereof. Each of the DODs may be at least substantially index matched to their surrounding medium (e.g., silica) at the carrier frequency in the input signal (e.g. 775 nm in the representative example discussed above) and may include a host polymer material that contains a chromophore as described above. As a result, the carrier signal component of the input signal will pass through each DOE without (or without substantially) being refracted thereby. However, the sideband component(s) of the input signal will be refracted at each interface between a DOE and the surrounding medium (e.g., silica) in the DOD. Because DOD is in the form of a planar waveguide circuit, each of the sideband refractions will occur in the plane of the waveguiding layer of DOD 910, with the total angular deflection of a sideband increasing with the number of DOE/medium interfaces that the sideband crosses. In embodiments, the total angular deflection of a sideband increases linearly or substantially linearly with the number of DOE/medium interfaces, but such is not required and DOD 910 may be configured differently.

Light exiting DOD 910 may be conveyed to optional optics 911. When used, optics 911 may be free space optics that may be used to focus or otherwise interact with the light output from DOD 910. For example, optics 911 may include one or more lenses which are configured to direct light output from DOD 910 onto detector 913. Optional detector 913 may be any suitable detector for detecting the light output of DOD 910, such as but not limited to a charge capture device (CCD) detector, a photomultiplier detector, a focal plane array (e.g., camera), combinations thereof, and the like. When used, optional detector 913 may be configured to detect the light output from DOD 910 and produce a detection signal, which may be provided to an optional signal processor 915 for processing.

For clarity and illustration, one example of the operation of instrument 900 will now be described. In this example, carrier source 903 is a low relative intensity noise (RIN) laser that is configured to provide a narrow bandwidth optical carrier at 1550 nm, input RF source 905 is configured to provide an input RF signal at 12.5 GHz, and modulator 907 is an electrooptic modulator. Modulator 907 receives the carrier signal and modulates it with the input RF signal to produce an output signal that includes the carrier signal at 1550 nm and sidebands at 1550.5 nm and 1549.5 nm. The output signal is provided to wavelength converter 909, which in this example is a frequency doubler. Wavelength converter 909 doubles the frequency of the carrier and sidebands in the output signal to produce an input signal that includes a carrier signal at 775 nm and sidebands at 775.05 nm and 774.95 nm.

For example and applying the above example, wavelength converter 909 may receive and double the frequency of a modulated signal including a carrier signal at 1550 nm and sidebands at 1550.1 nm and 1549.9 nm from modulator 907, resulting in the production of a signal that includes a carrier at 775 nm and sidebands at 775.05 nm and 774.95 nm, respectively. The converted signal may then be supplied as an input signal to DOD 910. The input signal is provided to DOD 910, which in this case is a planar waveguide that includes a silica waveguiding layer and a DOE embedded in the silica waveguiding layer. The DOE includes a polymer and a chromophore and are index matched to the material of the silica waveguiding layer at 775 nm. The DOE has a symmetrical prism shape with a first (upstream) surface and a second (downstream) surface, such that first and second interfaces are formed between the upstream surface and the silica waveguiding layer and the downstream surface and the silica waveguiding layer, respectively.

Figure 9:
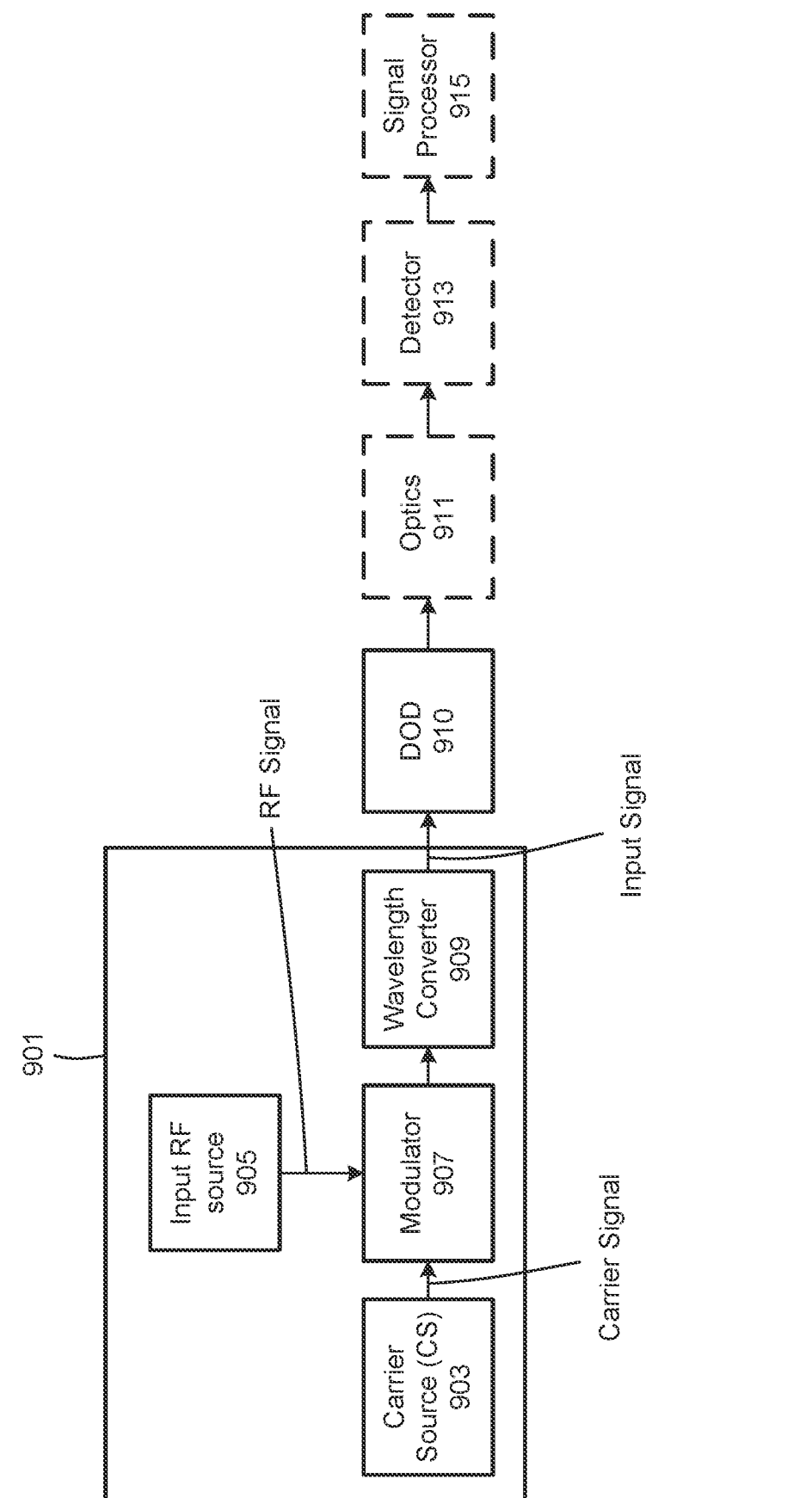
FIG. 9 is a block diagram of one example of an optical instrument consistent with the present disclosure.

The input signal is provided to the waveguiding layer of DOD 910 and is incident on the first interface at an angle of 88° from normal. The 775 nm carrier component of the input signal exits the first interface at 88° from normal (due to the index matching of the DOD to the silica waveguiding layer at 775 nm). However, the 775.05 nm sideband component of the input signal leaves the first interface at 88.0572° and the 774.95 nm sideband component of the input signal leaves the first interface at 87.9443°. The 775 nm carrier component exits the second interface at 88° (again due to the index matching), whereas the 775.05 nm and 774.95 nm sidebands exit the second interface at 87.8887° and 88.1146°, respectively. Assuming the light is traveling from left to right as shown in FIG. 9, the 775.05 nm sideband would be rotated 0.1113° counter-clockwise relative to the 775 nm carrier, whereas the 774.95 nm sideband would be rotated 0.1146° clockwise relative to the 775 nm carrier. The sidebands would also exist the second interface of the DOE at different positions, with the 775.05 nm sideband exiting closer to the apex of the prism shaped DOE, and the 774.95 sideband exiting closer to the base of the prism shaped DOE.

Accordingly, a single DOE consistent with the present disclosure can separate the 12.5 GHZ signal sidebands by more than 0.11° from the carrier signal. That degree of separation may be increased with the use of additional DOEs in the DOD as described above. For example, a DOD that includes identical DOEs arranged in series along a plane extending parallel to a through a silica waveguiding layer could provide an angular separation of the sidebands from the carrier by at least 0.75°, i.e., an amount that is useful for a variety of applications.

As may be appreciated, the technologies described herein provide a relatively simple and scalable mechanism for separating narrowly spaced wavelengths of light. The spacing of wavelengths that may be separated by the DOEs and DODs described herein is much finer than what can be separated by an arrayed waveguiding grating, which is typically capable of separating wavelengths that are separated by tens of nanometers. Moreover, unlike an arrayed waveguiding grating, the DODs and DOEs described herein do not require the power of an input signal to be split between separate analysis channels. Finally and as described above, the DODs and DOEs can enable the analysis of much higher frequencies than can be achieved by many electronics based approaches.

As used herein, the term "about" when used in conjunction with a value or range, means+/−5% of the indicated value or range, and/or within engineering tolerances.

As used herein, the term "on" when used in connection with two layers means that a first layer is formed above a second layer, but does not require the first layer to contact a surface of the second layer. Thus, a first layer may be on a second layer, even if the first and second layers are separated by a third layer. In contrast, the term "directly on" means that a first layer formed above and in direct contact with a second layer.

From the foregoing it will be appreciated that, although specific examples have been described herein for purposes of illustration, various modifications may be made without deviating from the spirit and scope of the disclosure described herein. Accordingly, the disclosure is not limited except as by corresponding claims and the elements recited by those claims. In addition, while certain aspects of the disclosure may be presented in certain claim forms at certain times, the inventors contemplate the various aspects of the disclosure in any available claim form. For example, while only some aspects of the disclosure may be recited as being embodied in a computer-readable medium at particular times, other aspects may likewise be so embodied.

What is claimed is:

1. A dispersive optical device (DOD), comprising:
a first material having a first refractive index (n1) at a first wavelength (W1) and a first chromatic dispersion (D1); and
at least one dispersive optical element (DOE) optically coupled in the first material, the at least one DOE comprising a second material containing a chromophore;
wherein:
the at least one DOE has a second refractive index (n2) at W1;
a ratio of n2 to n1 is less than or equal to about 1.05; and
the at least one DOE has a second chromatic dispersion (D2), wherein D2 is at least 10 times greater than D1.

2. The DOD of claim 1, wherein the first material comprises silica.

3. The DOD of claim 1, wherein the second material is a polymer.

4. The DOD of claim 3, wherein the second material comprises a fluorinated homopolymer.

5. The DOD of claim 1, wherein the chromophore is selected from the group consisting of (p-diethylamino-phenyl-hexa-1,2,7-triene, 1-pentafluoro, 2,2-dicyanoethylene (VC8), N-Ethyl-N-(2-hydroxyethyl)-4-(4-nitrophenylazo)aniline (DR1), (2-[4-[(E,3B)-3-[3-[(E)-2-[4-[bis[2-[tert-butyl(dimethyl)silyl]oxyethyl]amino]phenyl]ethenyl]-5,5-dimethylcyclohex1-2-en-1-ylidene]prop-1-enyl]-3-cyano-5,5-dimethylfuran-2-ylidene]propanedinitrile (CLD)-1) and combinations thereof.

6. The DOD of claim 1, wherein the at least one DOE has a prism shape.

7. The DOD of claim 1, wherein:
the at least one DOE comprises a first DOE embedded in the first material and a second DOE embedded in the first material;
the first DOE and second DOE each comprise said second material containing said chromophore; and said first and second optical DOEs are arranged in series with each other within the said first material.

8. The DOD of claim 1, wherein D2 is at least 100 times greater than D1.

9. The DOD of claim 1, wherein the DOD is a planar waveguide circuit.

10. A planar waveguide circuit, comprising:
a substrate;
a waveguiding layer on the substrate, the waveguiding layer comprising a first material having a first refractive index (n1) at a first wavelength (W1) and a first chromatic dispersion (D1); and
at least one dispersive optical element (DOE) arranged along a first plane extending parallel to and through the waveguiding layer, the at least one DOE comprising a second material containing a chromophore;
wherein:
the at least one DOE has a second refractive index (n2) at W1;
a ratio of n2 to n1 is less than or equal to about 1.05; and
the at least one DOE has a second chromatic dispersion (D2), wherein D2 is at least 10 times greater than D1.

11. The planar waveguide circuit of claim 10, wherein the first material comprises silica.

12. The planar waveguide circuit of claim 11, wherein said silica is doped.

13. The planar waveguide circuit of claim 10, wherein the second material comprises a polymer.

14. The planar waveguide circuit of claim 13, wherein the second material comprises a fluorinated homopolymer.

15. The planar waveguide circuit of claim 10, wherein the chromophore is selected from the group consisting of (p-diethylamino-phenyl-hexa-1,2,7-triene, 1-pentafluoro, 2,2-dicyanoethylene (VC8), N-Ethyl-N-(2-hydroxyethyl)-4-(4-nitrophenylazo)aniline (DR1), 2-[4-[(E,3E)-3-[3-[(E)-2-[4-[bis[2-[tert-butyl(dimethyl)silyl]oxyethyl]amino]phenyl]ethenyl]-5,5-dimethylcyclohex1-2-en-1-ylidene]prop-1-enyl]-3-cyano-5,5-dimethylfuran-2-ylidene]propanedinitrile (CLD-1), and combinations thereof.

16. The planar waveguide circuit of claim 10, wherein the at least one DOE has a prism shape.

17. The planar waveguide circuit of claim 10, wherein:
the at least one DOE comprises a first DOE and a second DOE; and
the first DOE and second DOE are arranged in series with other and are each arranged along the first plane.

18. The planar waveguide circuit of claim 10, wherein D2 is at least 100 times greater than D1.

19. An optical instrument, comprising:
a source configured to provide an input signal comprising at least a carrier signal at a first wavelength (W1) and a sideband to the carrier signal at a second wavelength (W2), wherein W2 is offset above or below W1; and
a dispersive optical device (DOD) configured to receive the input signal, the DOD comprising:
a first material having a first refractive index (n1) at W1 and a first chromatic dispersion (D1); and
at least one dispersive optical element (DOE) embedded in the first material, the at least one DOE comprising a second material containing a chromophore;
wherein:
the at least one DOE has a second refractive index (n2) at W1;
a ratio of n2 to n1 is less than or equal to about 1.05; and the at least one DOE has a second chromatic dispersion (D2), wherein D2 is at least 10 times greater than D1.

20. The optical instrument of claim 19, wherein said offset is less than or equal to 1 nanometer.

21. The optical instrument of claim 19, wherein the first material comprises silica.

22. The optical instrument of claim 19, wherein the second material is a polymer.

23. The optical instrument of claim 22, wherein the second material comprises a fluorinated homopolymer.

24. The optical instrument of claim 19, wherein the chromophore is selected from the group consisting of (p-di-ethylamino-phenyl-hexa-1,2,7-triene, 1-pentafluoro, 2,2-di-cyanoethylene (VC8), N-Ethyl-N-(2-hydroxyethyl)-4-(4-ni-trophenylazo)aniline (DR1), 2-[4-[(B,3E)-3-[3-[(E)-2-[4-[bis[2-[tert-butyl(dimethyl)silyl]oxyethyl]amino]phenyl]ethenyl]-5,5-dimethylcyclohex1-2-en-1-ylidene]prop-1-enyl]-3-cyano-5,5-dimethylfuran-2-ylidene] propanedinitrile (CLD-1), and combinations thereof.

25. The optical instrument of claim 19, wherein the at least one DOE has a prism shape.

26. The optical instrument of claim 19, wherein:

the at least DOE comprises a first DOE embedded in the first material and a second DOE embedded in the first material;

the first DOE and second DOE each comprise said second material containing said chromophore; and said first and second DOEs are arranged in series with each other within the said first material.

27. The optical instrument of claim 19, wherein D2 is at least 100 times greater than D1.

28. The optical instrument of claim 19, wherein said first material forms at least part of a waveguiding layer of a planar waveguide circuit, and said at least one DOE is arranged along a plane extending parallel to and through the waveguiding layer.

* * * * *